Dec. 25, 1951     M. J. O. LOBELLE     2,579,683
PILOT SEAT EJECTOR FOR AIRCRAFT
Filed July 22, 1949     4 Sheets-Sheet 1
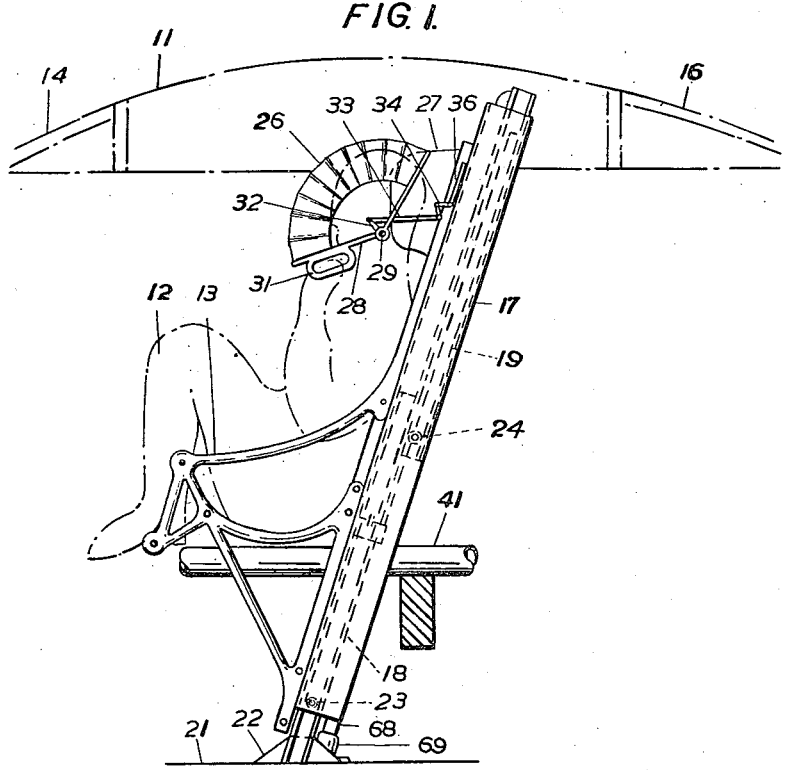
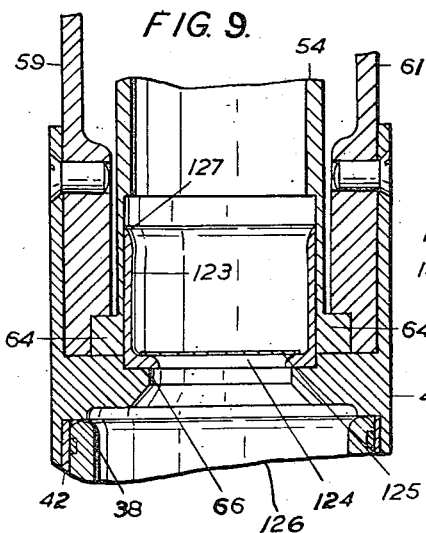
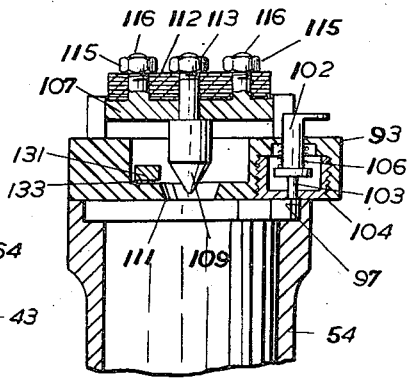
Inventor
Marcel J. O. Lobelle
By Emery Holcombe & Blair
Attorneys

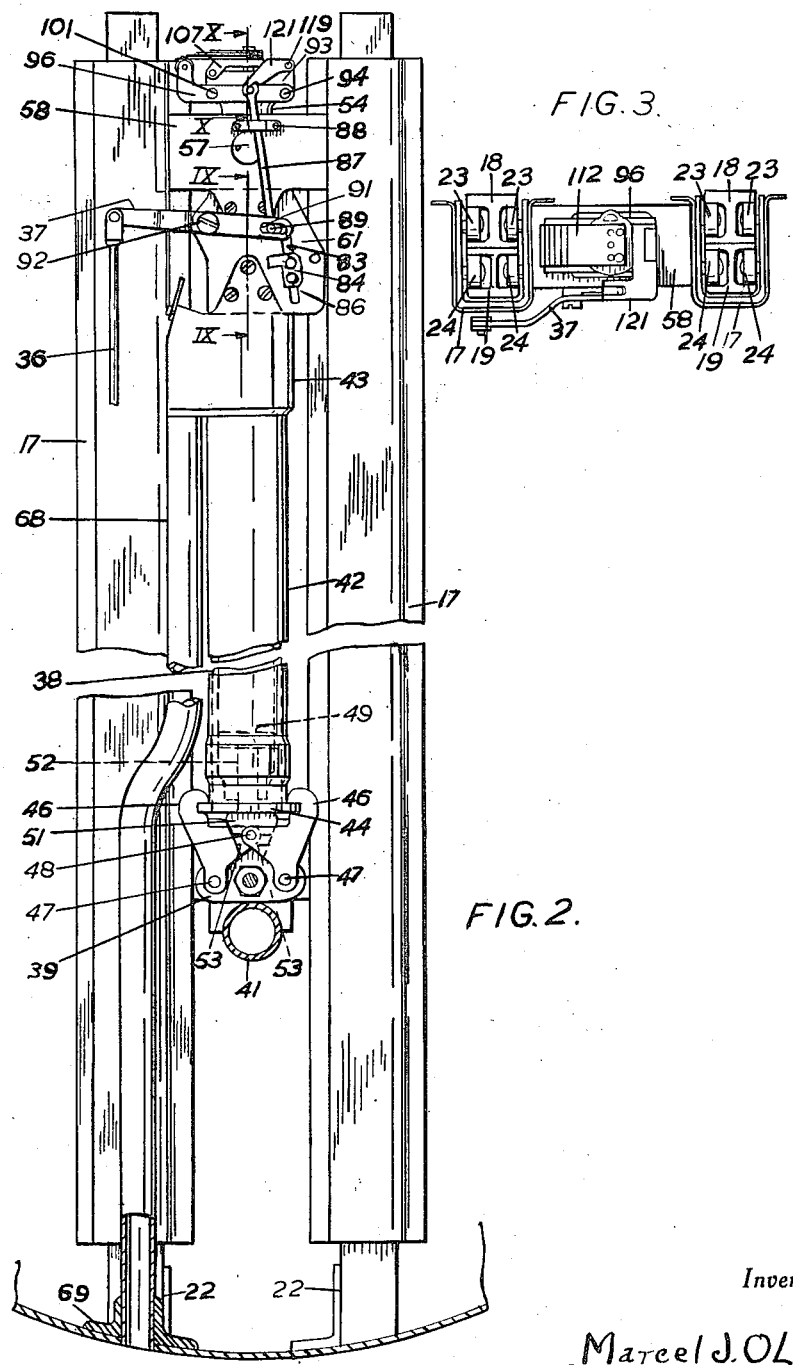

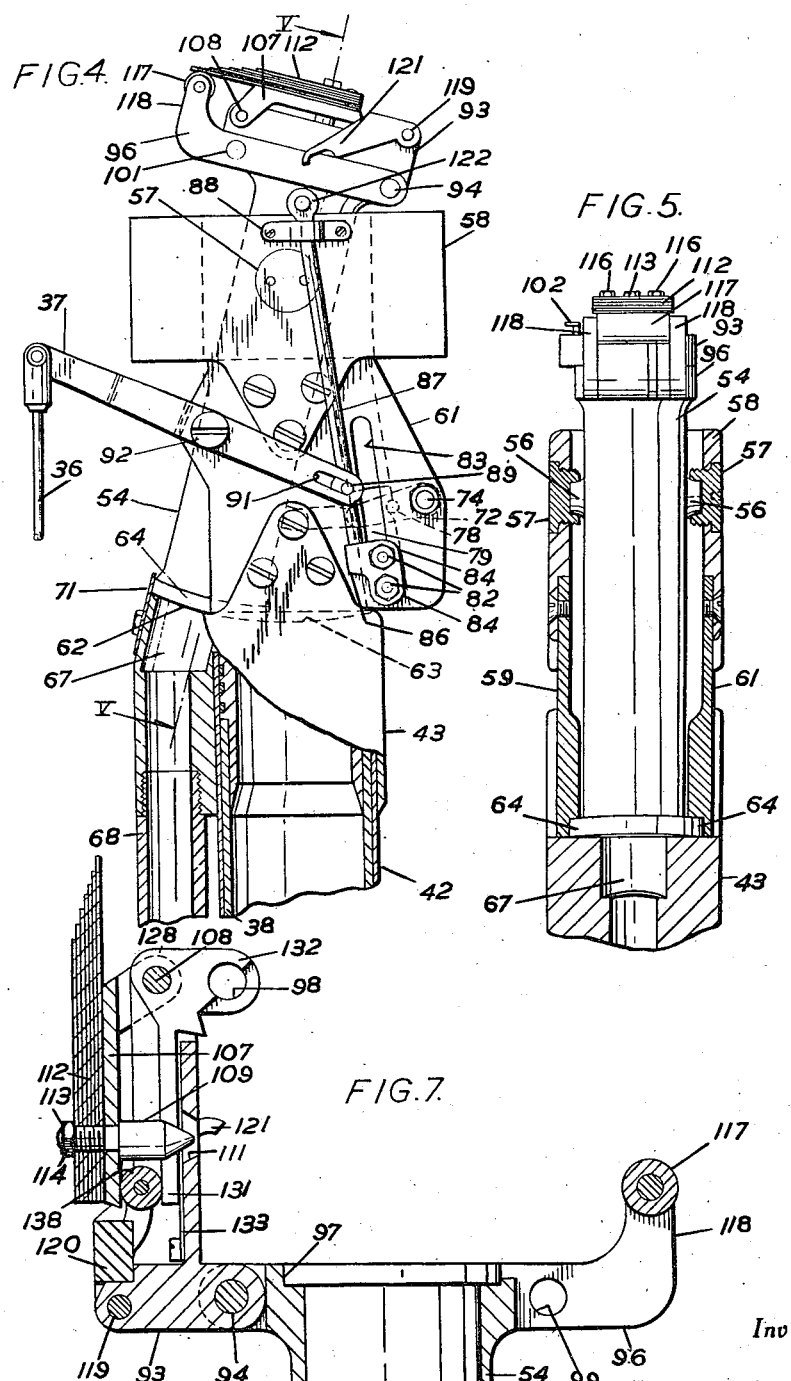

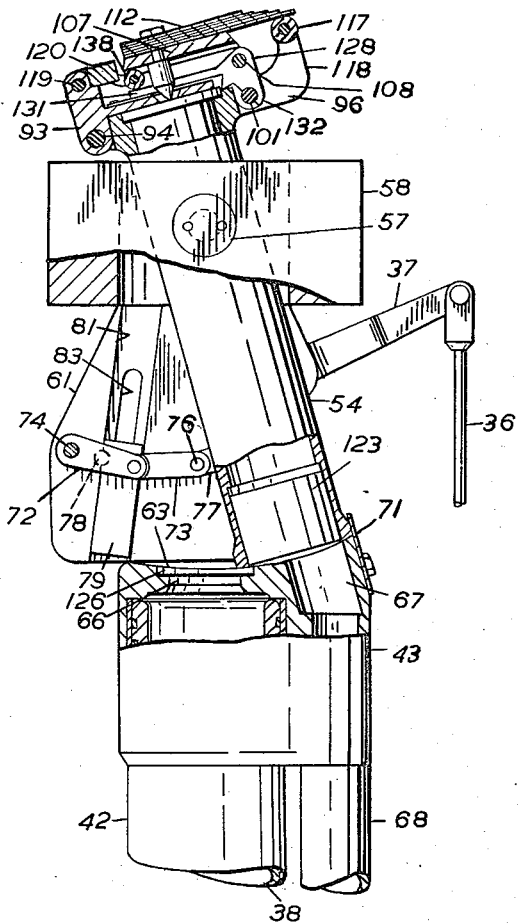
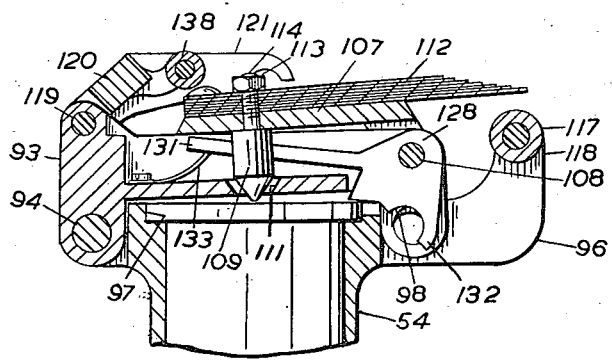

Patented Dec. 25, 1951

2,579,683

UNITED STATES PATENT OFFICE 2,579,683

PILOT SEAT EJECTOR FOR AIRCRAFT

Marcel Jules Odilon Lobelle, White Waltham, Maidenhead, England, assignor to Messrs. M. L. Aviation Company Limited, White Waltham, Maidenhead, England, a British company Application July 22, 1949, Serial No. 106,153
In Great Britain July 26, 1948

8 Claims. (Cl. 244—122)

This invention relates to seat ejection apparatus for the pilots and other occupants of aircraft of the kind in which the seat is adapted to be ejected through an opening in the aircraft by the pneumatic pressure of an explosive charge.

The invention is concerned particularly with seat ejection apparatus of the type described in British Patent specification No. 590,253, in which a pilot's seat is mounted by means of guide members in the aircraft so that it can slide in an upward direction under the influence of an ejecting device comprising telescopic cylinders adapted to hold an explosive charge, while a locking device adapted normally to secure the seat in its working position is arranged to be released automatically by the gas pressure resulting from the explosion of the charge.

The object of the present invention is to provide a construction of ejecting device in which the risk of accidental firing of the cartridge is minimised and in which the consequences of accidental firing are rendered harmless.

The invention is illustrated by way of example in the accompanying drawings, of which:

Figure 1 is a side elevation of an ejectable seat installed in an aircraft.

Figure 2 is a shortened front view on an enlarged scale of the seat ejecting mechanism looking aft, with the seat removed from its supporting channels;

Figure 3 is a plan view of Figure 2;

Figure 4 is an elevation partly in section of the swinging breech mechanism seen from the front;

Figure 5 is a section on the line V—V of Figure 4;

Figure 6 is a rear view, partly broken away, of the swinging breech mechanism;

Figure 7 is a central transverse section of the top of the breech with the breech head open and correctly arranged for loading;

Figure 8 is a similar view to Figure 7 but shows the operation of the safety latch when the breech head is incorrectly arranged;

Figure 9 is an enlarged sectional view of part of the swinging breech mechanism on the line IX—IX in Figure 2, and Figure 10 is a central sectional view of the upper part of the breech on the line X—X in Figure 2.

The ejectable seat is installed in the cabin of an aircraft beneath a displaceable canopy 11 which can be jettisoned by known means during an emergency so that the pilot 12 in his seat 13 can be ejected without interference through the opening formed between the front 14 and rear 16 fixed panels fore and aft of the canopy 11.

The seat structure is mounted at the rear on a pair of channels 17 (see Figures 2 and 3) which are adapted to slide on rearwardly inclined lower and upper pairs of guide rails 18 and 19, which are fixed to the floor of the aircraft by means of brackets 22. The lower and upper guide rails 18 and 19 together form an integral structure, the lower rails 18 having an I-shaped section forming guides for lower pairs of rollers 23 mounted on the channels 17, and the upper guide rails 19 also having an I-shaped section forming guides for pairs of upper rollers 24 mounted on the channels 17.

This staggered arrangement of guide rails and rollers serves to sustain any torsional loading imposed on the seat back and yet permits the rollers 23 to leave the rails 18, and the rollers 24 to leave the rails 19 simultaneously.

The installation also includes a protective apron 26 attached to the pilot's head rest 27, the apron being of known type in which the front is carried by radius arms 28 which can turn on pivots 29 when pulled forward and downward by the handle grips 31.

As will be later described the pulling down of the apron 26 is made to operate the ejection apparatus, and for this purpose a lever 32, fast with one of the arms 28, operates through a connecting rod 33, a bell-crank lever 34 and link 36, on the operating lever 37, shown in Figures 2, 4 and 6. The seat is arranged to be ejected by detonating an explosive charge, from which the products of combustion enter telescopic cylinders mounted between the rails after the manner described in British patent specification No. 590,253.

As shown in Figure 2 the inner telescopic cylinder 38 is mounted at its lower end on a bracket 39, which is carried on rails 18 which are attached to the aircraft structure, while the outer telescopic cylinder 42 is fixed in a cylinder head 43 attached to the seat back via channels 17. These two cylinders are termed the reaction cylinder and the ejection cylinder, respectively. As shown in Figures 1 and 2 the bracket 39 normally rests on an aileron control tube 41 which passes beneath the pilot's seat. A flange 44 on the bottom of the outer or ejection cylinder 42 is normally held by a pair of claws 46, mounted by pivots 47 on the bracket 39, these claws being held together by means of a shear pin 48. The claws 46 are releasable upon detonation of the explosive charge by a piston 49 mounted within the inner or reaction cylinder 38. This piston 49 carries a saddle 51 on the end of its stem 52 which rests against oblique cam faces 53 formed on the claws, so that under pressure of the explosive charge on the piston 49, the saddle 51 forces the claws 46 apart, shearing the pin 48 and releasing the flange 44 on the outer cylinder 42.

Referring to Figures 2, 4, 5 and 6, the explosive charge is carried by a breech tube 54 having trunnions 56 which are supported by bearing bushes 57 in a bearing block 58. The bearing block 58 is attached to the seat back via channels 17 but it is also fixed to the cylinder head 43 by means of cheek plates 59 and 61. The mouth 62 of the breech tube 54 has a cylindrically curved surface which works over a correspondingly curved concave surface 63 on the breech head, while a curved lip 64 on each side of the breech mouth engages slidably beneath an undercut at the bottom of each of the cheek plates 59 and 61 (see Figure 9).

A central opening 66 in the cylinder head opens directly into the ejection cylinder space, and to one side of the cylinder head 43 there is another port 67 which communicates directly with an exhaust tube 68 fixed at its upper end in the cylinder head, and extending at its lower end slidably into a collar 69 (see Figure 2) where it terminates in communication with the atmosphere.

Except in cases of emergency, the breech tube 54 is maintained in communication with the exhaust tube 68, and pressing up against a leaf spring 71 on the cylinder head by toggle links 72 and 73. This toggle is maintained slightly over centre between a cross pin 74 mounted in the cheek plates 59, 61, and a pivot 76 which is carried by a lug 77 projecting from the side of the breech tube 54, (see Figures 4 and 6).

The toggle link 72 carries a stud 78, which in the over-centre position of the toggle, rests in a notch formed in the side of a slide bar 79, which is slidably mounted in the cheek plate 61. This slide bar 79 works in a groove 81 cut on the inside face of the cheek plate 61, and it is maintained in the groove by studs 82 which project through a slot 83 in the cheek plate 61 into a bracket 84 which slide over the outer face of the cheek plate 61. This bracket 84 has a side lug 86 which carries an actuating rod 87, the actuating rod being guided in the upper part through a cleat 88 attached to the bearing block 58. The actuating rod 87 is in turn connected through a pin 89, and slot 91, coupling with the actuating lever 37 previously referred to, this actuating lever being pivoted on a screw 92 fixed in the cheek plate 61.

In the safe position of the breech tube 54 where it is in communication with the exhaust tube 68 the slide bar 79 has its lower stud 82 resting at the bottom of the slot 83, while the link 36 and the end of the actuating lever 37 to which it is attached are fully raised, corresponding to the retracted position of the protective apron 26. Pulling down the protective apron will consequently raise the slide bar 79 and collapse the toggle links 72, 73, by the action of the notch in the slide bar 79 on the stud 78 on the toggle link 72. As the slide bar 79 continues to rise the stud 78 rides out of the notch, and the side of the slide bar 79 locks the toggle in the collapsed position with the breech tube 54 turned into the firing position, during the continued upward movement of the slide bar and actuating rod 87. The manner in which the further upward movement of the actuating rod 87 is utilised to fire the cartridge will now be described.

The firing mechanism, (see particularly Figures 6, 7 and 10) is mounted on a breech block 93 which is pivotally mounted on a pin 94 held in a fork on one side of the breech head 96, which is integral with breech tube 54. The top of the breech tube 54 is formed with a recess 97 in which the rim of the cartridge fits so that it lies flush with the surface of the breech head 96. On the opposite side of the breech block 93 from the pivot 94, there is a lug with a hole 98 which will register with similar holes 99 in the sides of the breech head 96 through which a fixing pin 101 can be inserted to secure the breech block 93 over the base of the cartridge. A tell-tale indicator consisting of a plunger 102 is mounted in the breech block 93 with its stem 103 passing downward through a retaining nut 104 adjacent the recess 97 in the breech tube 54. A spring 106 is interposed to press the plunger 102 down towards the recess, so that the elevation of the plunger 102 will indicate whether or not the breech tube 54 is loaded with a cartridge. A striker arm 107 is mounted on a pivot 108 in the breech block 93 and this striker arm carries a firing pin 109 which is located centrally above the detonator cap of the cartridge when the breech block is closed, the breech block 93 having a central aperture 111 through which the firing pin 109 may strike. The striker arm 107 carries also a pack of leaf springs 112 which are secured by a nut 113 on the shank 114 of the firing pin 109, and also by nuts 115 which are screwed on studs 116 projecting from the striker arm 107 (see Figure 10). An abutment roller 117 is mounted on an upward projection 118 from the breech head 96 against which roller 117 the spring pack 112 is flexed when the breech block 93 is closed, as in Figures 2, 4 and 6. The outer end of the striker arm 107 is held from turning inwards by a roller 138 mounted on the firing arm 120. The side of the firing arm 120 remote from the roller 117 is forked around a lug on the breech block 93 to which it is hinged by means of a pin 119. A trip lever 121 integral with the firing arm 120 (see Figures 2, 4 and 8) is disposed so that when the breech tube 54 is vertical, the outer end of the trip lever 121 lies in the path of a cross pin 122 in the head of the actuating rod 87. The cross pin 122 does not raise the trip lever 121 until the breech tube 54 is locked and registered with the ejection cylinders.

The upward motion of the actuating rod 87 turns the firing arm 120 about its pivot 119, thus raising the striker arm 107 so that the flexural load on the spring pack 112 is increased. Ultimately the roller 138 will trip past the outer edge of the striker arm 107, allowing this to spring back and fire the cartridge.

To prevent the escape of explosion gases at the joint between the breech tube 54 and the cylinder head 43, the mouth of the breech tube is counterbored to receive a sealing sleeve 123 (see Figure 9). This sealing sleeve 123 has a central opening 124 which is normally closed by a diaphragm 125. The diaphragm is strong enough to withstand the initial pressure developed, for the purpose of sliding the sleeve 123 downward so that the lower part enters a recess 126 formed in the concave surface 63 of the cylinder head 43. The above sleeve 123 first presses against the bottom of the recess 126 to form an effective seal against the cylinder head 43, while its rear edge 127 is feathered to provide an effective seal within the breech tube 54. With this achieved, the diaphragm 125 will collapse under the increasing pressure of the explosion and admit the explosion gases to the ejection and reaction cylinders.

A safety device is incorporated in the breech block 93 to prevent the fixing pin 101 for the breech block 93 being inserted unless the firing arm 120 is placed with its roller 138 lying underneath the striker arm 107. For this purpose a latch arm 128 is carried by the pivot 108 on the breech block 93, the latch arm 128 having an arm portion 131 extending across the breech block underneath the striker arm 107, and a latch portion 132 extending downward in proximity with the fixing hole 99 in the breech head 96. A plate spring 133 fixed to the breech block 93 presses under the tip of the arm 131 and when the roller 138 lies under the striker arm 107 on the firing arm 120, it will press down on the arm 131 to lie flat against the upper surface of the breech block 93, as shown in Figure 7. When the breech block 93 is closed on the breech head 96 so that the latch portion 132 is concentric with the fixing hole 98 in the breech block 93, this allows the fixing pin 101 to be inserted.

If, however, the breech block 93 is lowered, as in Figure 8 with the roller 138 above the striker arm 107, the spring 133 partly raises the arm 131 so that the latch 132 interferes with the insertion of the fixing pin 101.

This lever is shaped to engage on both sides of the actuating lever 37 under spring pressure and prevent the lever 37 from turning on its pivot 92. When, however, the seat is moved back into the correct position of installation for ejection, the tip of the lever 134 is pressed back by a cross bar 139 or other member of the seat structure so that the slotted arm 137 is turned out of engagement with the actuating lever 37 to permit the latter to be operated.

I claim:

1. Seat ejection apparatus for aircraft comprising guide means fixed in the aircraft, an ejectable seat mounted in said guide means, an ejection cylinder attached to said seat, a reaction cylinder mounted on said guide means, one of said cylinders being mounted slidably within the other, an exhaust tube fixed on said ejection cylinder, a movable breech for said ejection cylinder, said breech having a tube adapted to hold an explosive charge, firing mechanism mounted on said breech, and actuating means adapted to move said breech from a safe position where it is in communication with said exhaust tube into the firing position where it is in communication with said ejection cylinder, said actuating means being also adapted to operate the firing mechanism only when said breech is in the firing position.

2. Seat ejection apparatus according to claim 1, wherein the actuating means comprises toggle mechanism connected to said breech tube, a locking device adapted to secure said toggle mechanism when the breech tube is in the firing position, and a single actuating element adapted to operate said toggle mechanism, said locking device and the firing mechanism in sequence.

3. Seat ejection apparatus according to claim 1, wherein the firing mechanism comprises a breech block hinged to said breech tube, fixing means adapted to secure said breech block to said breech tube, said breech block being adapted to close on and secure an explosive cartridge in said breech tube, a striker arm hinged to said breech block, resilient means adapted to load said striker arm, said resilient means being rendered operative upon closure of said breech block, and a firing arm pivoted to said breech block, said firing arm being adapted to trip said striker arm when turned on its pivot by said actuating element.

4. Seat ejection apparatus according to claim 3, wherein said firing means comprises a firing pin, cooperating apertures in said breech block and breech tube adapted to receive said fixing pin, and a movable safety latch disposed in cooperative engagement with said firing arm, said safety latch being adapted to obstruct said apertures except when the firing arm is set to trip said striker arm.

5. Seat ejection apparatus for aircraft comprising guide means fixed in the aircraft, an ejectable seat mounted in said guide means, an ejection cylinder attached to said seat, a reaction cylinder mounted on said guide means, one of said cylinders being mounted slidably within the other, an exhaust tube attached to said seat, a cylinder head fixed to said ejection cylinder and to said exhaust tube, a curved surface on said cylinder head formed with a port opening into said ejection cylinder and another port opening into said exhaust tube, a breech tube mounted pivotally on said seat, said breech tube being adapted to hold an explosive charge, firing mechanism mounted on said breech tube, and actuating means adapted to turn said breech tube from a safe position where the mouth of said breech tube opens into the exhaust port in said cylinder head, to a firing position where it opens into the cylinder port, said actuating means being adapted to operate the firing mechanism only when said breech tube is in the firing position.

6. Seat ejection apparatus according to claim 5, comprising also a sealing sleeve slidably mounted in the mouth of said breech tube, a perforatable closure in said sealing sleeve adapted to withstand the initial pressure of the explosive charge, and wherein a recess is formed around the cylinder port in the curved surface of said cylinder head, said recess being adapted to receive said sleeve and to cooperate therewith in forming a gas seal between said beech tube and said cylinder head.

7. Seat ejection apparatus according to claim 5, wherein a curved lip is provided on each side of the mouth of said breech tube, while the cylinder head is provided with curved stop surfaces, said stop surfaces being slidably engaged by said curved lips and adapted to retain said breech tube thereby against the reaction thrust due to combustion of said explosive charge.

8. Seat ejection apparatus for aircraft comprising in combination guide means fixed in the aircraft, an ejectable seat mounted in said guide means, a protective apron device fixed to said seat, said apron being arranged to be pulled down over the face of an airman seated in the seat, an ejection cylinder attached to said seat, a reaction cylinder mounted on said guide means, one of said cylinders being mounted slidably within the other, an exhaust tube fixed on said ejection cylinder, a movable breech for said ejection cylinder, said breech being adapted to hold an explosive charge, firing mechanism mounted on said breech, and actuating means arranged to move said breech from a safe position where it is in communication with said exhaust tube into the firing position where it is in communication with said ejection cylinder, said actuating means being operatively connected with said protective apron device for operation thereby, and being also adapted to operate the firing mechanism only when said breech is in the firing position.

MARCEL JULES ODILON LOBELLE.

(References on following page)

REFERENCES CITED

The following references are of record in the file of this patent:

UNITED STATES PATENTS

| Number | Name | Date |
|---|---|---|
| 23,224 | Barber et al. | Mar. 15, 1859 |
| 37,048 | Milbank | Dec. 2, 1862 |
| 1,337,336 | Townsley | Apr. 20, 1920 |
| 1,339,432 | Barr | May 11, 1920 |
| 2,331,309 | Curriston | Oct. 12, 1943 |
| 2,335,822 | Bowers | Nov. 30, 1943 |
| 2,467,763 | Martin | Apr. 19, 1949 |

FOREIGN PATENTS

| Number | Country | Date |
|---|---|---|
| 581,889 | Great Britain | Oct. 29, 1946 |